(12) United States Patent
Jung et al.

(10) Patent No.: US 10,006,995 B2
(45) Date of Patent: Jun. 26, 2018

(54) METHOD AND APPARATUS FOR STACKING MULTI-TEMPORAL MAI INTERFEROGRAMS

(71) Applicant: University of Seoul Industry Cooperation Foundation, Seoul (KR)

(72) Inventors: Hyung Sup Jung, Seoul (KR); Min-Jeong Jo, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 440 days.

(21) Appl. No.: 14/817,699

(22) Filed: Aug. 4, 2015

(65) Prior Publication Data

US 2016/0033639 A1    Feb. 4, 2016

(30) Foreign Application Priority Data

Aug. 4, 2014  (KR) .................. 10-2014-0099940

(51) Int. Cl.
*G01S 13/90* (2006.01)

(52) U.S. Cl.
CPC .............................. *G01S 13/9023* (2013.01)

(58) Field of Classification Search
CPC .................................................. G01S 13/9023
USPC ........................................................ 342/25 C
See application file for complete search history.

(56) References Cited

U.S. PATENT DOCUMENTS

| 2015/0042648 A1 | 2/2015 | Jung et al. |
| 2015/0268340 A1* | 9/2015 | Bruyere .............. G01S 13/9023 342/25 C |

FOREIGN PATENT DOCUMENTS

| JP | 3987451 B2 | 10/2007 |
| KR | 10-0425283 B1 | 3/2004 |
| KR | 10-1111689 B1 | 2/2012 |
| KR | 10-1135070 B1 | 4/2012 |
| KR | 10-1291219 B1 | 7/2013 |
| KR | 10-1514143 B1 | 4/2015 |
| WO | 2014-104550 A1 | 7/2014 |
| WO | 2014-200258 A1 | 12/2014 |

\* cited by examiner

*Primary Examiner* — Timothy A Brainard
(74) *Attorney, Agent, or Firm* — Mintz Levin Cohn Ferris Glovsky and Popeo, P.C.; Kongsik Kim; Jonathon Western

(57) ABSTRACT

An apparatus and method for stacking multi-temporal MAI interferograms Disclosed are disclosed herein. The apparatus includes a processor configured to: generate a forward-looking InSAR (Interferometric Synthetic Aperture Radar) interferogram and a backward-looking InSAR interferogram of multi-temporal interferometric pairs; generate a residual forward-looking interferogram and a residual backward-looking interferogram by removing low-frequency phase components from the forward-looking InSAR interferogram and the backward-looking InSAR interferogram; generate a stacked forward-looking interferogram and a stacked backward-looking interferogram by separately stacking the residual forward-looking interferogram and the residual backward-looking interferogram; and generate a stacked MAI interferogram based on a phase difference between the stacked forward-looking interferogram and the stacked backward-looking interferogram.

13 Claims, 12 Drawing Sheets

METHOD AND APPARATUS FOR STACKING MULTI-TEMPORAL MAI INTERFEROGRAMS

CROSS-REFERENCE TO RELATED APPLICATION

This application claims under 35 U.S.C. § 119(a) the benefit of Korean Application No. 10-2014-0099940 filed on Aug. 4, 2014, which is incorporated herein by reference.

TECHNICAL FIELD

The present invention relates generally to a method and apparatus for stacking multi-temporal multiple aperture SAR interferometry (MAI) interferogram and, more particularly, to technology for extracting precise ground surface displacement in the along-track direction of a satellite via the stacking of multi-observed MAI interferograms, thereby improving the precision of the observation of three-dimensional ground surface displacement using imaging radars.

BACKGROUND ART

Interferometric Synthetic Aperture Radar (InSAR) is the most effective method that is capable of observing ground surface displacement in the line-of-sight (LOS) direction of a satellite antenna in an area of tens of kilometers. InSAR started to be used in earnest by observing displacement in the Landers earthquake in U.S.A. in the early 1990s, and has been advanced by the institutes of European countries. In Korea, research into the utilization of InSAR in the development of technology and the field of earth science has been conducted chiefly by the research teams of universities.

The early InSAR was used to observe sporadic ground surface displacement, attributable to large-scale geotectonic movement, i.e., an earthquake or volcanic eruptions, occurring during a period in which two images were acquired from a single interferometric pair, but has been developed into research into the observation of mean displacement velocity for multiple periods and time series analysis by the accumulation of imaging radar data over a long period. This multi-temporal observation method has improved the precision of the measurement of ground surface displacement in the LOS direction of a sensor by reducing noise phase components in images.

Recently, in order to overcome the greatest disadvantage of the conventional InSAR, i.e., the disadvantage of being able to measure only displacement in the LOS direction of an antenna, technologies for observing ground surface displacement in an along-track direction have been developed. In this regard, there is a conventional measurement method using a correlation coefficient between two images. However, this method has a limitation in terms of application in connection with an application area and the magnitude of displacement because the precision of ground surface displacement in an along-track direction measured using the method is very low.

A recently developed MAI measurement scheme has been proposed based on the split beam InSAR, and has improved precision to a level two or more times those of the conventional measurement methods. An early MAI scheme had the problem of a distortion error resulting from a change in the perpendicular baseline of an interferometric pair. In contrast, current technology has solved this problem, and is successful in measuring ground surface displacement in an along-track direction with centimeter-level precision. Accordingly, research into the performance of the observation of three-dimensional ground surface displacement via the integrated observation of the conventional InSAR and the improved MAI scheme has been conducted.

However, the precision of MAI measurement schemes known so far has been limitedly applied to the observation of large-scale ground surface displacement ranging from tens of centimeters to a few meters, such as large-scale tectonic movement or the movement of glaciers at high speed. However, these MAI measurement schemes have a difficulty observing ground surface displacement in an area in which continuous displacement occurs on a few-centimeter per year scale. Accordingly, in order to measure small-scale ground surface displacement, there is a need for a technology for improving the precision, reached by the current technology for measuring ground surface displacement in an along-track direction, to a centimeter or higher level.

Korean Patent No. 10-1111689 entitled "Method for Three-dimensional Deformation Measurement and Apparatus Thereof" presents a method including steps of: extracting ground surface displacement in the LOS direction of a synthetic aperture radar (SAR) using the InSAR data of the synthetic aperture radar; generating MAI data using forward-looking SAR data and backward-looking SAR data, and extracting ground surface displacement in the along-track direction of the SAR using the generated MAI data; and extracting three-dimensional ground surface displacement from the ground surface displacement in the LOS direction and the ground surface displacement in the along-track direction.

This technology mentioned above is advantageous in that it can extract ground surface displacement in the LOS direction and ground surface displacement in the along-track direction using the InSAR interferogram and the MAI interferogram and accurately extract three-dimensional ground surface displacement from the ground surface displacement. However, this technology mentioned above is problematic in that it has a difficulty observing ground surface displacement in an area in which continuous displacement occurs on a few-centimeter per year scale because it cannot improve the precision of a technology for measuring ground surface displacement in the along-track direction to a centimeter or higher level.

SUMMARY OF THE DISCLOSURE

Accordingly, the present invention has been made keeping in mind the above problems occurring in the prior art, and an object of the present invention is to precisely observe ground surface displacement in an area in which continuous displacement occurs on a small scale.

Another object of the present invention is to extract precise ground surface displacement in the along-track direction of a satellite via the stacking of multi-observed MAI interferograms, thereby improving the precision of the observation of three-dimensional ground surface displacement using imaging radars.

Still another object of the present invention is to improve the precision of the observation of ground surface displacement in the along-track direction of a satellite, which is insufficient in the case of the conventional art, to a centimeter or higher level.

In accordance with an aspect of the present invention, there is provided an apparatus for stacking multi-temporal MAI interferogram may be implemented as a computer system which comprises a processor (not shown) therein.

The processor includes an interferogram generation unit, a residual interferogram generation unit, a stacked interferogram generation unit, and a stacked MAI interferogram generation unit.

The interferogram generation unit generates forward-looking interferogram and backward-looking interferogram of multi-temporal interferometric pairs. The residual interferogram generation unit generates residual forward-looking interferogram and residual backward-looking interferogram by removing low-frequency phase components from InSAR interferograms. The stacked interferogram generation unit generates a stacked forward-looking interferogram and a stacked backward-looking interferogram by separately stacking the residual forward-looking interferograms and the residual backward-looking interferograms. The stacked MAI interferogram generation unit generates a stacked MAI interferogram based on the phase difference between the stacked forward-looking interferogram and the stacked backward-looking interferogram.

The apparatus may further include a correction unit configured to correct an error in a residual phase of the stacked MAI interferogram, and the correction unit may correct the residual phase error of the stacked MAI interferogram. In this case, the correction unit may correct the error using a polynomial model generated based on information about a location and altitude of each pixel. The stacked MAI interferogram generation unit may generate the stacked MAI interferogram using a phase difference calculated via the complex conjugate multiplication of the stacked forward-looking interferogram and the stacked backward-looking interferogram.

The residual interferogram generation unit may include a noise filtering unit configured to remove high frequency components from the InSAR interferogram, and a calculation unit configured to calculate a phase difference via complex conjugate multiplication of the filtered InSAR interferogram and the forward-looking interferogram or complex conjugate multiplication of the filtered InSAR interferogram and the backward-looking interferogram. The residual interferogram generation unit may generate the residual interferograms so that each of the residual forward-looking interferograms and the residual backward-looking interferograms includes a phase component and noise related to a motion in the along-track direction of an independent satellite sensor.

The interferogram generation unit may generate the single look complex (SLC) images of a forward-looking imaging radar and backward-looking imaging radar with respect to master and slave images of each of the multi-temporal interferometric pairs, may accurately co-register the SLC images, and may generate the forward-looking interferograms and the backward-looking interferograms using complex conjugate multiplication.

In accordance with another aspect of the present invention, there is provided a method of stacking multi-temporal MAI interferograms, including: generating forward-looking interferograms and backward-looking interferograms of multi-temporal interferometric pairs; generating residual forward-looking interferograms and residual backward-looking interferograms by removing low-frequency phase components from InSAR interferograms; generating a stacked forward-looking interferogram and a stacked backward-looking interferogram by separately stacking the residual forward-looking interferograms and the residual backward-looking interferograms; and generating a stacked MAI interferogram based on the phase difference between the stacked forward-looking interferogram and the stacked backward-looking interferogram.

The method may further include correcting an error in a residual phase of the stacked MAI interferogram, and the correcting an error may be performed using a polynomial model generated based on information about a location and altitude of each pixel. The generating a stacked MAI interferogram may include generating the stacked MAI interferogram using the phase difference calculated via the complex conjugate multiplication of the stacked forward-looking interferogram and the stacked backward-looking interferogram.

The generating residual forward-looking interferograms and residual backward-looking interferograms may include removing high frequency components from the InSAR interferograms, and calculating the phase difference via the complex conjugate multiplication of the filtered InSAR interferogram and the forward-looking interferogram or the complex conjugate multiplication of the filtered InSAR interferogram and the backward-looking interferogram. The generating residual forward-looking interferogram and residual backward-looking interferogram may include generating the residual phase interferogram so that each of the residual forward-looking interferogram and the residual backward-looking interferogram includes a phase component and noise related to a motion in the along-track direction of an independent satellite sensor.

The generating forward-looking interferogram and backward-looking interferogram may include generating the single look complex (SLC) images of a forward-looking imaging radar and backward-looking imaging radar with respect to master and slave images of each of the multi-temporal interferometric pairs, accurately co-registering the SLC images, and generating the forward-looking interferogram and the backward-looking interferogram using complex conjugate multiplication.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Terms and words that are used in the present specification and the claims should not be restrictively interpreted as having common and dictionary meanings, but should be interpreted as having meanings and concepts in conformity with the technical spirit of the present invention based on the principle in which an inventor can appropriately define the concepts of terms in order to describe his or her invention in the best way.

Accordingly, the embodiments described in the present specification and the configurations illustrated in drawings are merely preferred embodiments of the present invention and do not represent all the technical spirit of the present invention, it should be understood that there may be various equivalents and modifications that may replace the embodiments and the configurations at the time at which the present application is filed.

The terms used herein are merely intended to describe specific embodiments and not to limit the present invention. Unless otherwise stated, the singular expression includes a plural expression. In this application, the terms "include" or "have" are used to designate the presence of one or more features, numbers, steps, operations, components, parts or combinations thereof described in the specification, and should not be understood as excluding the presence or probability of addition of one or more different features, numbers, steps, operations, components, parts or combinations thereof.

Hereinafter, embodiments of the present invention will be described in detail with reference to the accompanying drawings. In the following description of the present invention, detailed descriptions of known elements or functions that may unnecessarily make the gist of the present invention obscure will be omitted. Furthermore, in the following description of the present invention, specific numeral values are merely examples.

Figure 1:
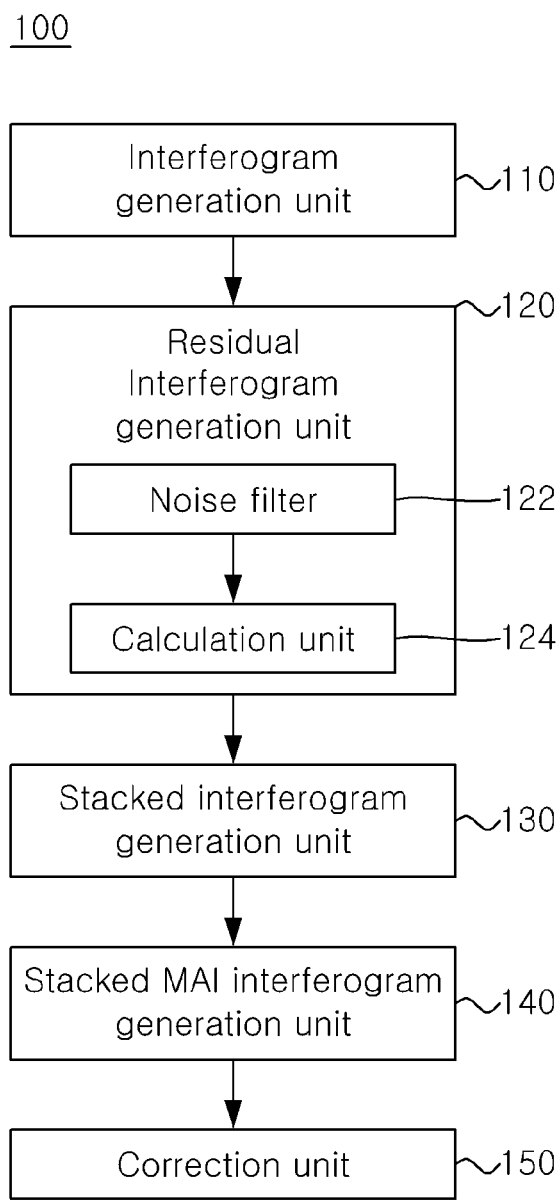
FIG. 1 is a diagram schematically showing the configuration of an apparatus for stacking multi-temporal MAI interferograms according to an embodiment of the present invention.

FIG. 1 is a diagram schematically showing the configuration of an apparatus for stacking multi-temporal MAI interferograms according to an embodiment of the present invention.

Referring to FIG. 1, the apparatus for stacking multi-temporal MAI interferogram according to the present embodiment may be implemented as a computer system which comprises a processor (not shown) therein. The processor includes an interferogram generation unit 110, a residual interferogram generation unit 120, a stacked interferogram generation unit 130, a stacked MAI interferogram generation unit 140, and a correction unit 150.

The interferogram generation unit 110 generates forward-looking InSAR interferogram and backward-looking InSAR interferogram of multi-temporal interferometric pairs.

That is, the interferogram generation unit 110 generates the single look complex (SLC) images of a forward-looking imaging radar and a backward-looking imaging radar with respect to master and slave images of the multi-temporal interferometric pairs, accurately co-registers the SLC images, and generates the forward-looking InSAR interferogram and the backward-looking InSAR interferogram using complex conjugate multiplication.

More specifically, the interferogram generation unit 110 generates the SLC images of the forward-looking imaging radar and the backward-looking imaging radar with respect to master and slave images of the multi-temporal interferometric pairs, accurately co-registers the SLC images, and generates the forward-looking InSAR interferogram and the backward-looking InSAR interferogram using complex conjugate multiplication.

In this case, the selection of the multi-temporal interferometric pairs is determined by taking into account a perpendicular baseline between satellite sensors. The perpendicular baseline refers to a vertical component in the LOS direction from the difference between the locations of two satellite sensors when the two satellite sensors observe the same scatterer on the ground surface at two observation times. An increase in the length of the perpendicular baseline causes a reduction in the coherence of InSAR interferograms. An interferometric pair having a perpendicular baseline length equal to or longer than a threshold does not generate an interferometric phase. Accordingly, multi-temporal interferometric pairs having a short perpendicular baseline may be selected as the multi-temporal interferometric pairs that are used in the present embodiment.

Furthermore, each of the forward-looking interferograms generated by the interferogram generation unit 110 is generated from a forward-looking SLC image pair generated from the master and slave images. Each of the backward-looking interferograms generated by the interferogram generation unit 110 is generated from a backward-looking SLC image pair generated from the master and slave images. In this case, the forward-looking SLC image and the backward-looking SLC image are generated via signal compression after Doppler center frequencies and Doppler bandwidths in forward-looking and backward-looking have been determined based on a normalized squint adjustment parameter n. The normalized squint adjustment parameter is used to electrically adjust the antenna aperture size of a sub-aperture SLC image. Generally, 0.5 is used as the value of the normalized squint adjustment parameter. As the value of the squint adjustment parameter becomes close to 1, the bandwidth of a sub-aperture Doppler is reduced, and the resolution of a forward-looking SLC image and a backward-looking SLC image is reduced.

Furthermore, the interferogram generation unit 110 may generate the forward-looking interferogram and the backward-looking interferogram in accordance with the following common procedure.

That is, when generating the forward-looking interferogram and the backward-looking interferogram, the interferogram generation unit 110 performs the processes of (1) generating the SLC images of the data of master and slave images via the signal compression of raw multi-temporal imaging radar data, (2) accurately co-registering the master and slave images, (3) performing common band filtering on an interferometric pair in order to improve the quality of the interferograms, (4) calculating a phase difference via the complex conjugate multiplication of the two co-registered images, and (5) removing a topographic altitude phase using a digital elevation model (DEM). In this case, a phase unwrapping process is not performed.

In this case, at process (2) of accurately co-registering the master and slave images, the accurate co-registration process of re-sampling the slave image based on the master image uses the same transform coefficient when generating the forward-looking interferogram and the backward-looking interferogram and when generating an InSAR interferogram. Accordingly, the interferogram generation unit 110 according to the present embodiment may generate the forward-looking interferogram and the backward-looking interferogram by applying a conversion equation, used to generate the InSAR interferogram, in the same manner when the interferogram is generated.

The residual interferogram generation unit 120 generates residual forward-looking interferograms and residual backward-looking interferograms by removing low-frequency phase components from InSAR interferograms.

More specifically, the residual interferogram generation unit 120 generates residual forward-looking interferograms and the residual backward-looking interferograms by removing low-frequency phase components from InSAR interferograms generated via a full-aperture Doppler bandwidth from the sub-aperture interferograms, i.e., the forward-looking interferograms and the backward-looking interferograms. In this case, the sub-aperture interferogram refers to a forward-looking interferogram or a backward-looking interferogram. The full-aperture interferogram refers to an interferogram generated from a master SLC image and a slave SLC image generated using all valid signals without dividing an aperture.

The residual interferogram generation unit 120 is the core technology of a method of stacking multi-temporal MAI interferograms according to the present embodiment. More specifically, the residual interferogram generation unit 120 may include a noise filtering unit 122 configured to filter out noise from the InSAR interferogram, and a calculation unit 124 configured to calculate the difference (i.e., the phase difference) between the forward-looking interferogram and the InSAR interferogram between the backward-looking interferogram and the InSAR interferogram.

That is, the residual interferogram generation unit 120 may include the noise filtering unit 122 and the calculation unit 124. The noise filtering unit 122 removes a high frequency component from the InSAR interferogram. The calculation unit 124 calculates the phase difference via the complex conjugate multiplication of the InSAR interferogram filtered by the noise filtering unit 122 and the forward-looking interferogram or backward-looking interferogram generated by the interferogram generation unit 110.

Accordingly, in the residual interferogram generated via the noise filtering unit 122 and calculation unit 124 of the residual interferogram generation unit 120, each of the residual forward-looking interferogram and the residual backward-looking interferogram includes a phase component and noise related to the along-track direction motion of an independent satellite sensor. That is, the residual interferogram generation unit 120 generates each of the residual forward-looking interferogram and the residual backward-looking interferogram so that it includes a phase component and noise related to the along-track direction motion of an independent satellite sensor.

More specifically, the noise filtering unit 122 filters out noise so that only a low-frequency component remains within the InSAR interferogram before a ground surface displacement component related to the LOS direction of the satellite sensor is removed from the forward-looking interferogram and the backward-looking interferogram generated by the interferogram generation unit 110.

Accordingly, the forward-looking interferogram and the backward-looking interferogram are generated via different Doppler bandwidths, and have independent signal characteristics. In contrast, the InSAR interferogram is generated via the entire Doppler bandwidth, and has a signal band partially overlapping the Doppler bandwidths of the forward-looking interferogram and the backward-looking interferogram. As a result, a noise component has similarity between the InSAR interferogram and the forward-looking interferogram or the backward-looking interferogram.

That is, the noise filtering unit 122 removes the noise component of a high-frequency characteristic from the InSAR interferogram based on the noise characteristics of the forward-looking interferogram, the backward-looking interferogram and the InSAR interferogram, and removes only a low-frequency ground surface displacement component from the forward and backward-looking interferograms based on the difference between the InSAR interferogram and the forward-looking interferogram or the backward-looking interferogram so that a noise component remains. For this purpose, the noise filtering unit 122 may increase a filter window when performing a filtering task, and may repeatedly perform the filtering task at least three times.

Meanwhile, the calculation unit 124 calculates a phase difference via the complex conjugate multiplication of the InSAR interferogram filtered by the noise filtering unit 122 and the forward-looking interferogram or backward-looking interferogram generated by the interferogram generation unit 110. Each of the residual forward-looking interferogram and the residual backward-looking interferogram generated from the InSAR interferogram includes a phase component and noise related to the along-track direction motion of an independent satellite sensor.

In this case, phase values attributable to the along-track direction motion within the residual forward-looking interferogram and the residual backward-looking interferogram have opposite signs because the LOS directions of sub-aperture interferograms have opposite directivities.

Furthermore, the residual interferogram generation unit 120 may perform a multi-look task of 3-4 looks and a filtering task in the azimuth direction (i.e., the along-track direction of a platform) and range direction (i.e., the direction perpendicular to the azimuth direction) of an interferogram from the generated residual forward-looking interferogram and residual backward-looking interferogram and a direction perpendicular to the range direction and azimuth direction, thereby minimizing a spatially randomly distributed noise component.

The stacked interferogram generation unit 130 generates a stacked forward-looking interferogram and a stacked backward-looking interferogram by separately stacking the residual forward-looking interferograms and the residual backward-looking interferograms generated by the residual interferogram generation unit 120.

That is, the stacked interferogram generation unit 130 generates a stacked interferogram by separately stacking the multi-temporal residual forward-looking interferograms and the residual backward-looking interferograms using the residual forward-looking interferograms and residual backward-looking interferograms generated by the residual interferogram generation unit 120.

In the present embodiment, since the residual forward-looking interferograms and the residual backward-looking interferograms are separately stacked via the stacked interferogram generation unit 130, advantages arise in that a signal to noise ratio (SNR) can be improved via noise attenuation within each sub-aperture interferogram, and thus the coherence between sub-aperture interferograms can be maximized. Furthermore, since an individual MAI interferometric phase calculation process for multi-temporal interferometric pairs is omitted, advantages arise in that an MAI interferogram stacking process can be simplified, and task processing efficiency can be improved.

In this case, the improvement of the coherence between a forward-looking interferogram and a backward-looking interferogram exerts a direct influence on the improvement of quality of an MAI interferogram (i.e., a stacked MAI interferogram in the present embodiment) generated via the above process. Accordingly, the residual interferogram generation unit 120 and the stacked interferogram generation unit 130 may be viewed as corresponding to core processes in the present embodiment.

Equation 1 is a representative factor used to evaluate the quality of an MAI interferogram, and may measure the standard deviation of an MAI interferometric phase. The coherence σ functions as a variable that determines the standard deviation of an MAI interferometric phase. The coherence of the MAI interferogram is improved as the coherence between a forward-looking interferogram and a backward-looking interferogram that generate an MAI increases. Accordingly, the residual interferogram generation unit 120 and the stacked interferogram generation unit 130 correspond to processes that exert a direct influence on the improvement of the quality of the MAI interferogram. The residual interferogram generation unit 120 and the stacked interferogram generation unit 130 may be viewed as corresponding to the core processes of the present embodiment.

Equation 1 below shows a relationship between the coherence of an MAI interferogram and the measured standard deviation of an MAI interferometric phase:

$$\sigma_{\Phi,MAI} = \frac{1}{\sqrt{N_L}} \frac{\sqrt{1-\rho^2}}{\rho} \quad (1)$$

where $N_L$ is the multi-look coefficient of the MAI interferogram and $\rho\square$ is the coherence.

Figure 3:
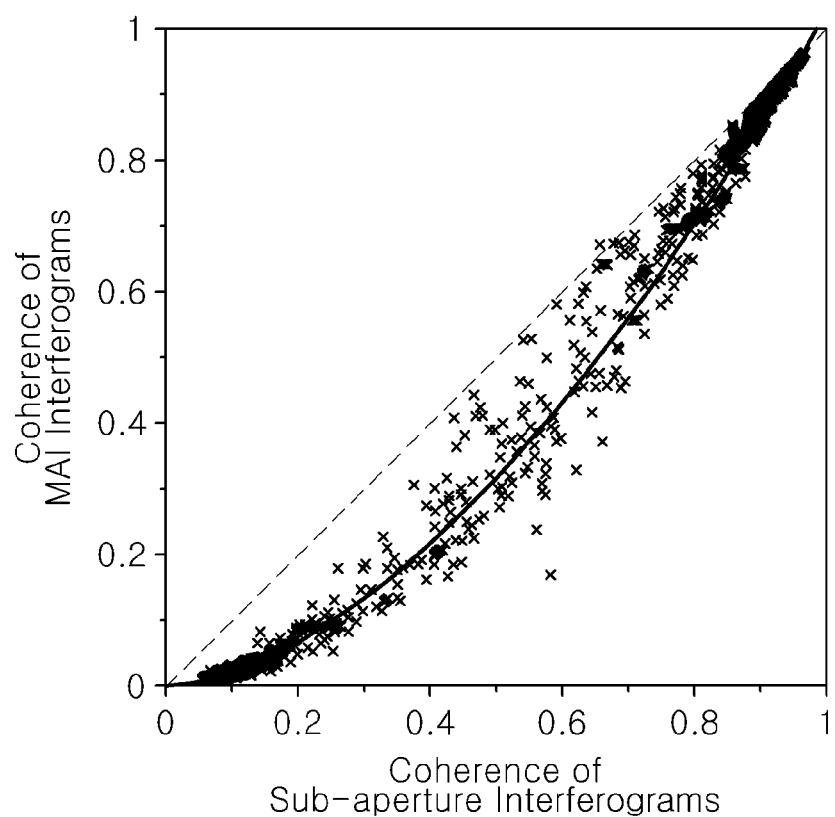
FIG. 3 is a graph showing the comparison between the coherence distribution of MAI interferograms according to an embodiment of the present invention and the coherence distribution of forward-looking interferograms and backward-looking interferograms used to generate the MAI interferograms.

FIG. 3 is a graph showing the comparison between the coherence distribution of an MAI interferogram according to an embodiment of the present invention and the coherence distribution of a forward-looking interferogram and a backward-looking interferogram used to generate the MAI interferogram.

Referring to FIG. 3, the X axis (i.e., the coherence of sub-aperture interferograms) denotes coherence values calculated from a forward-looking interferogram and a backward-looking interferogram. The Y axis (i.e., coherence of MAI interferograms) denotes a coherence value calculated from an MAI interferogram corresponding to the forward-looking interferogram and the backward-looking interferogram. Measured points shown in FIG. 3 were calculated from the respective pixels of the MAI interferogram and the sub-aperture interferograms.

According to the results of the measurement, the coherence values of all the measured points are distributed on the lower side of a one-to-one slope (i.e., a dotted line). This means that there is a phenomenon in which the coherence of the MAI interferogram is lower than those of the sub-aperture interferograms with respect to the same measured point. Furthermore, it may be seen that a reduction in the phenomenon in which coherence of the MAI interferograms is reduced becomes stronger as the coherence of the sub-aperture interferograms decreases from the tendency line (i.e., solid line) of the coherence distribution.

Accordingly, in order to improve the coherence of the MAI interferogram, the process of maximizing the coherence between sub-aperture interferograms is essential. If the technology for stacking multi-temporal MAI interferograms according to the present embodiment is used, the coherence between MAI interferograms can be effectively improved.

Figure 4:
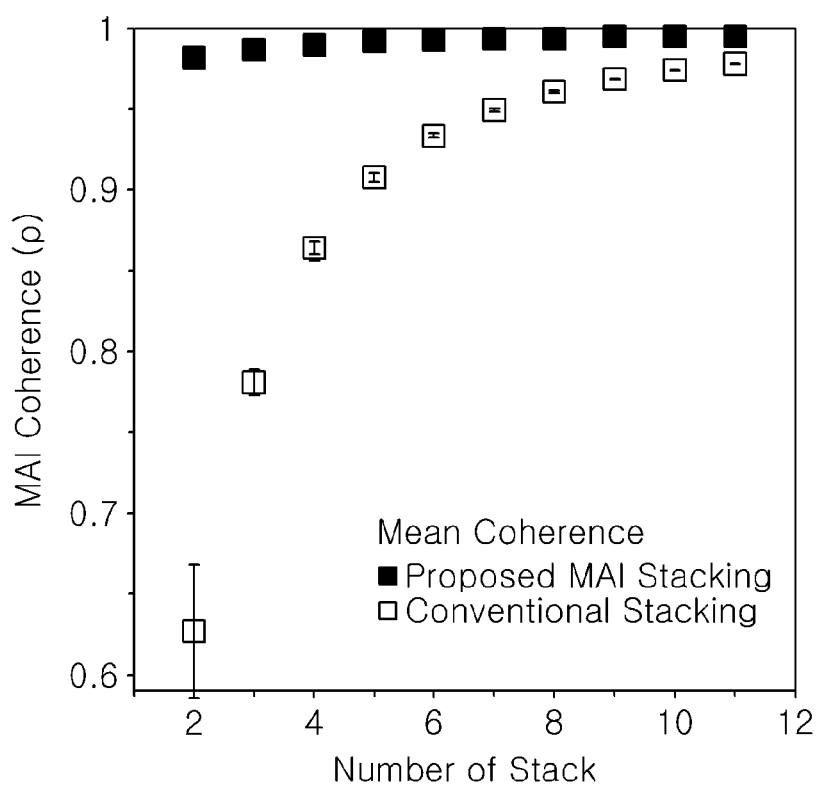
FIG. 4 is a graph showing the analysis of improvements in coherence based on increases in the number of stacked MAI interferometric pairs when multi-temporal MAI interferograms are stacked according to an embodiment of the present invention.

FIG. 4 is a graph showing the analysis of improvements in coherence based on increases in the number of stacked MAI interferometric pairs when multi-temporal MAI interferograms are stacked according to an embodiment of the present invention.

Referring to FIG. 4, coherence values shown in FIG. 4 show average coherence values in the entire interferogram region, and may be represented via normalized values ranging from 0 to 1. As a coherence value becomes closer to 1, the coherence value may be considered to be a measured value having high coherence and high reliability.

With regard to control groups used to verify the excellence of the method according to an embodiment of the present invention, the MAI interferograms of respective multi-temporal interferometric pairs were generated, and then comparison and analysis were performed on the MAI interferograms and the results of simple stacking and averaging. In FIG. 4, a filled shape ■ indicates the degree of the improvement of coherence of a stacked MAI interferogram generated using the method proposed according to an embodiment of the present invention. An empty shape □ indicates the degree of the improvement of coherence of a stacked MAI interferogram generated using a common stacking method. From FIG. 4, it may be seen that when the common stacking method is used, coherence is 0.9 or higher when six or more MAI interferometric pairs are stacked, whereas when the stacking method according to the present embodiment is used, coherence is 0.95 or higher even in the case of stacking using a small number of MAI interferometric pairs. Accordingly, the method and apparatus for stacking multi-temporal MAI interferograms according to the embodiments of the present invention have the possibility of accurately measuring a MAI interferometric phase using a small amount of data.

The stacked MAI interferogram generation unit 140 generates a stacked MAI interferogram based on a phase difference between the stacked forward-looking interferogram and the stacked backward-looking interferogram generated by the stacked interferogram generation unit 130.

In this case, the stacked MAI interferogram generation unit 140 may generate the stacked MAI interferogram based on the phase difference calculated using the complex conjugate multiplication of the stacked forward-looking interferogram and the stacked backward-looking interferogram.

More specifically, the stacked MAI interferogram generation unit 140 calculates the phase difference between the stacked forward-looking interferogram and the stacked backward-looking interferogram generated by the stacked interferogram generation unit 130. In this case, the process of calculating the phase difference, i.e., a difference acquisition process, is performed via the complex conjugate multiplication of the stacked forward-looking interferogram and the stacked backward-looking interferogram. A stacked MAI interferogram may be generated based on the stacked MAI interferometric phase calculated by the process.

In this case, the stacked MAI interferogram generated by the phase difference calculation (difference) process includes a residual phase error (i.e., a flat earth phase and an altitude phase) component generated from the difference between the perpendicular baseline of the stacked forward-looking interferogram and the perpendicular baseline of the stacked backward-looking interferogram. In order to correct the residual phase error component, in an embodiment of the present invention, the stacked MAI interferogram generation unit 140 may perform the process of correcting the stacked MAI interferogram after the stacked MAI interferogram has been generated. This correction may be performed using a method established by conventional research. For example, a method of generating a polynomial model using information about the location and altitude of each pixel and correcting the residual phase error component using the polynomial model may be used.

That is, the correction unit 150 corrects an error in the residual phase of the stacked MAI interferogram generated by the stacked MAI interferogram generation unit 140. In this case, the correction unit 150 may correct an error in the residual phase of the stacked MAI interferogram using a polynomial model generated based on information about the location and altitude of each pixel.

Meanwhile, MAI interferometric phases may be stacked by separately stacking residual forward-looking interferograms and residual backward-looking interferograms. The process of measuring ground surface displacement in the along-track direction of a satellite based on the stacked MAI interferometric phases may be expressed by Equation 2:

$$V_{MAI}(x) = \frac{l}{4\pi \cdot n} \left[ \left\{ \sum_{i=1}^{N} \Phi_{f.res}^{i}(x) \right\} - \left\{ \sum_{i=1}^{N} \Phi_{b.res}^{i}(x) \right\} \right] \bigg/ \sum_{i=1}^{N} \Delta t^{i} \quad (2)$$

In Equation 2, $V_{MAI}$ is average ground surface displacement velocity in the along-track direction of a satellite over a total observation period. This is calculated based on $$d = \frac{l}{4\pi \cdot n} \cdot \Phi_{MAI},$$

i.e., an equation used to convert an MAI interferometric phase into ground surface displacement in the along-track direction. In this equation, l is the effective antenna aperture of an imaging radar sensor, and n is a normalized squint adjustment parameter. Furthermore, $\Phi_{f,res}^{i}$ and $\Phi_{b,res}^{i}$ are the forward-looking-residual phase value and backward-looking-residual phase value of each interferometric pair used for stacking, respectively, and $\Delta t^{i}$ is an observation period for each interferometric pair.

Meanwhile, FIGS. 5A through 5D are diagrams showing the results of verification of the degree of velocity and precision of ground surface displacement in an along-track direction measured using a method of stacking multi-temporal MAI interferograms according to an embodiment of the present invention.

Referring to FIG. 5A through 5D, this experiment was conducted using the ENVSAT ASAR data of a C-band system obtained in the descent orbit of an imaging radar (i.e., data observed by a satellite while the satellite was flying from the direction of the North Pole to the direction of the South Pole). 11 pieces of raw imaging radar data were used in order to stack MAI interferograms. Furthermore, the Hawaii's Kilauea volcanic district in which a ground surface displacement of a few centimeters per year occurred in the along-track direction of the imaging radar sensor was selected as an experimental area for the verification of the MAI stacking method according to an embodiment of the present invention.

Figure 5A:
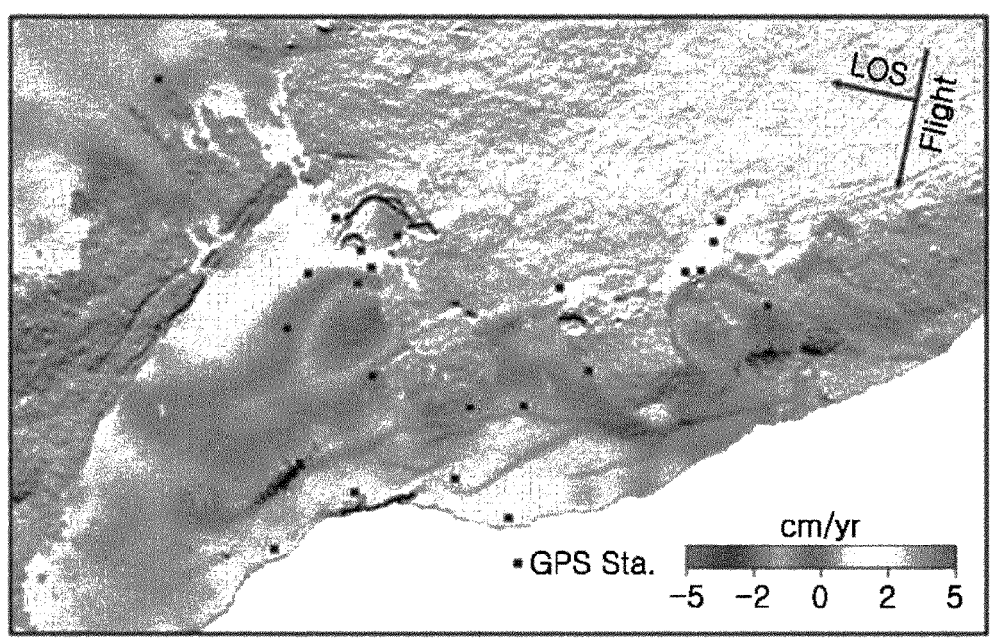
FIGS. 5A through 5D are diagrams showing the results of verification of the degree of velocity and precision of ground surface displacement in an along-track direction measured using a method of stacking multi-temporal MAI interferograms according to an embodiment of the present invention.
Figure 5B:
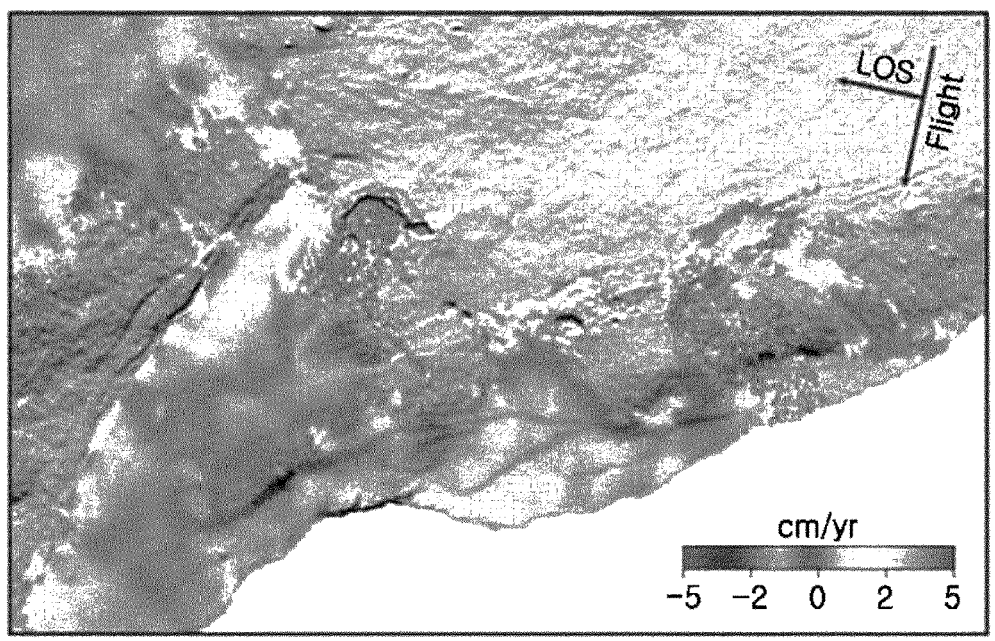
Figure 5C:
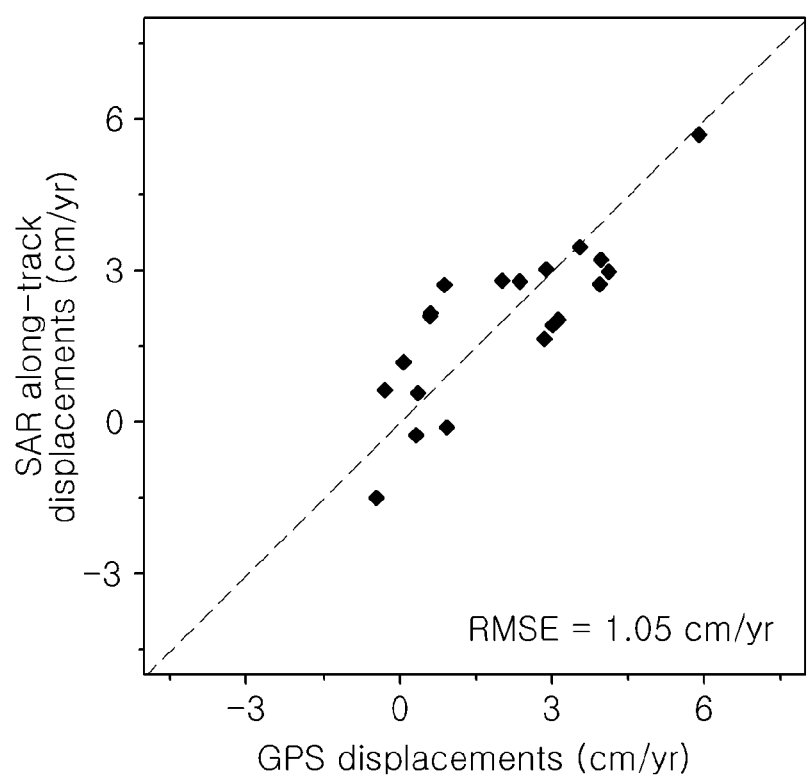
Figure 5D:
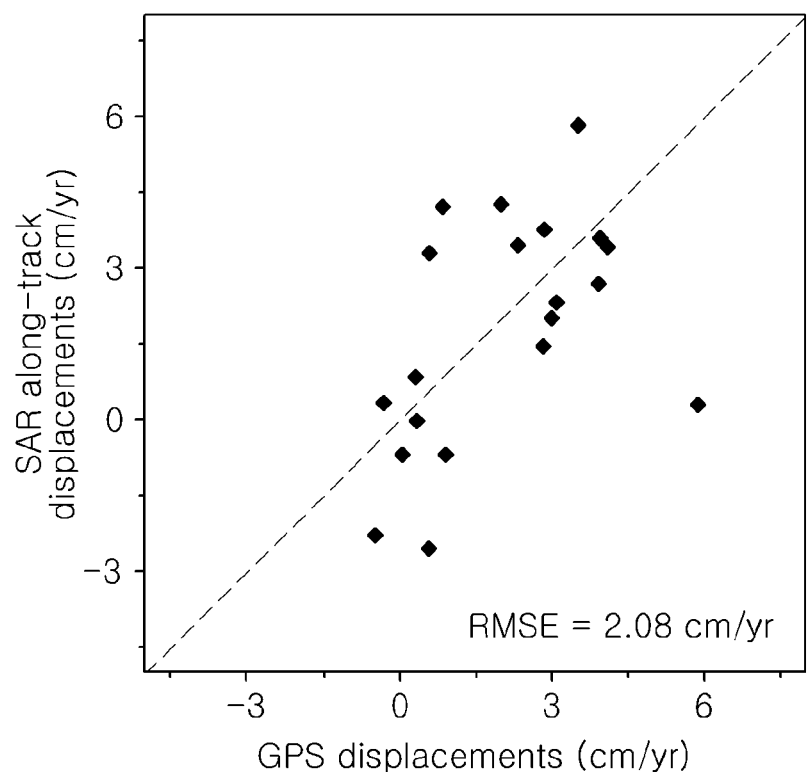
Figure 6A:
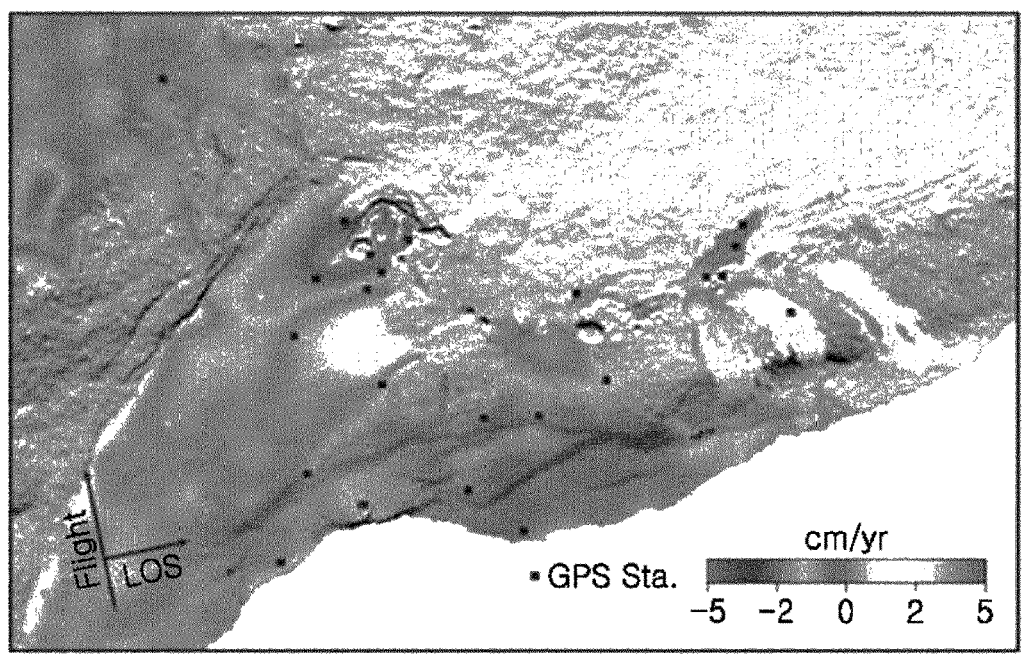
FIGS. 6A through 6D are diagrams showing the results of verification of the degree of velocity and precision of ground surface displacement in an along-track direction measured using a method of stacking multi-temporal MAI interferograms according to another embodiment of the present invention.
Figure 6B:
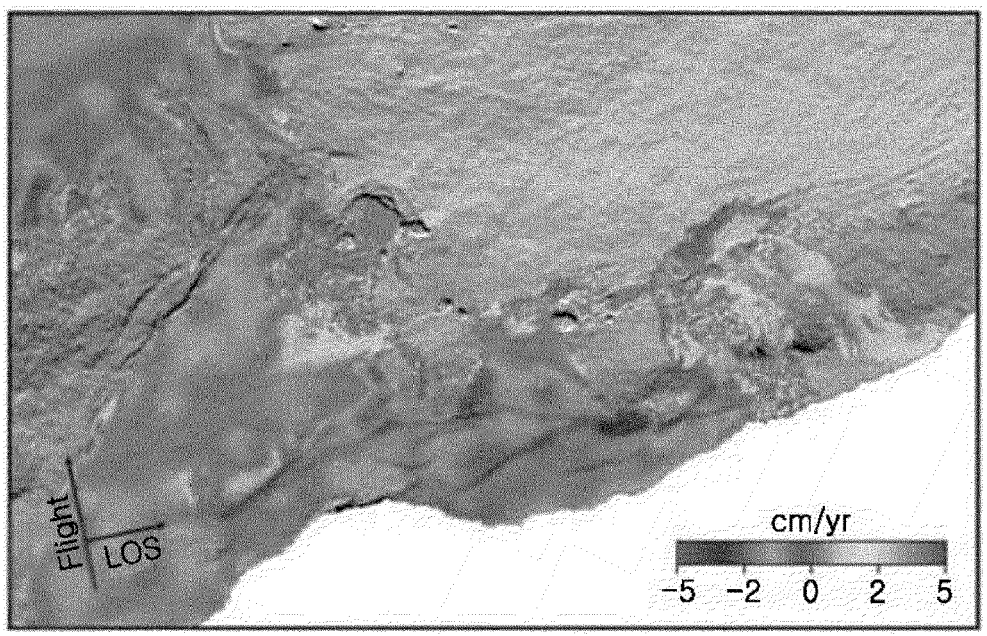
Figure 6C:
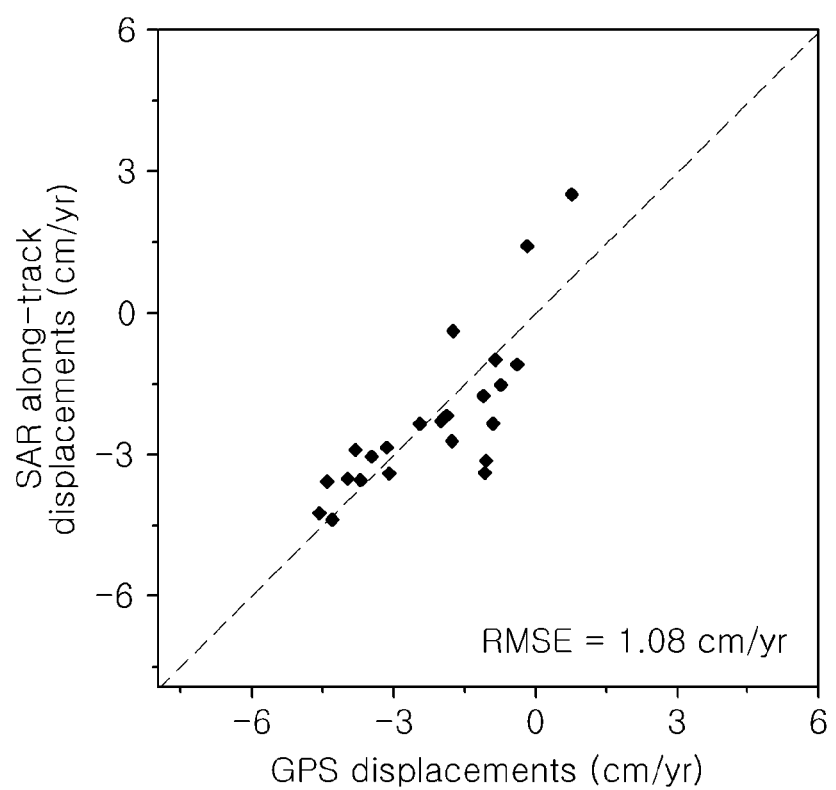
Figure 6D:
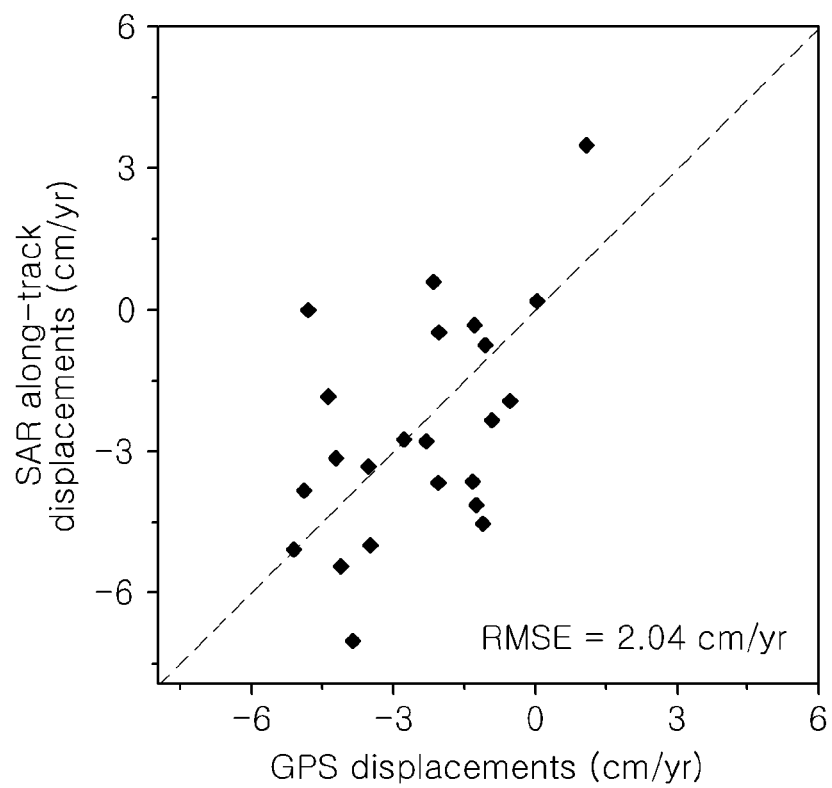

FIGS. 5A and 5C are the results of measurement obtained using the MAI stacking method proposed by the present embodiment. FIGS. 5B and 5D correspond to a control group for the method proposed by the present embodiment, and show the results of measurement obtained using a common stacking method.

From FIGS. 5A and 5B, it may be seen that ground surface displacement velocities observed using the two methods are distinctly different from each other in the East Rift Zone (ERZ) area in which volcano craters are arranged. That is, the ERZ crater area is an area in which changes in the ground surface are drastic due to the distribution of plants and animals and frequent volcanic activities and coherence is low. In the ERZ crater area, values having great noise were measured using the common stacking method. In contrast, ground surface displacement was observed with high precision by using the MAI stacking method proposed by the present embodiment.

In this case, in order to evaluate the accuracy of the observation values of ground surface displacement, the values of information about the locations of GPSs were collected by 25 regular observatories installed in the Kilauea district, and comparison and verification were performed on the values. From the graphs of FIGS. 5C and 5D showing the measured values, it may be seen that the measured values obtained by the MAI stacking method according to the present embodiment have high accuracy and a low deviation.

Furthermore, an error between the GPS measured values and the values of the ground surface displacement in the along-track direction measured by the imaging radar sensors had an accuracy of about 1.05 cm/yr via the MAI stacking method according to the present embodiment. In contrast, an error in the ground surface displacement values in the along-track direction measured based on the control group by using the common stacking method was 2.08 cm/yr. Furthermore, as a result of the comparison between the deviations of the measured values, the ground surface displacement measured using the MAI stacking method according to the present embodiment rarely had a deviation. In contrast, the ground surface displacement measured using the common stacking method had a significant deviation, thereby making it difficult to obtain reliable results. Accordingly, it could be seen that the measured values according to the method of stacking multi-temporal MAI interferograms proposed by the present embodiment had high accuracy and a low deviation.

FIGS. 6A through 6D are diagrams showing the results of verification of the degree of velocity and precision of ground surface displacement in an along-track direction measured using a method of stacking multi-temporal MAI interferograms according to another embodiment of the present invention.

Referring to FIGS. 6A through 6D, this experiment was conducted using data obtained in the ascent orbit of an imaging radar (i.e., data observed by a satellite while the satellite was flying from the direction of the South Pole to the direction of the North Pole). 10 pieces of raw imaging radar data were used. Furthermore, as in the experiment of FIGS. 5A through 5D, the Hawaii's Kilauea volcanic district was selected as an experimental area. The results of the observation of ground surface displacement in the along-track direction using the common stacking method were presented as a control group for the MAI stacking method proposed by the present embodiment.

The results of the experiment were similar to those of FIGS. 5A through 5D. From the results of mean displacement velocity shown in FIGS. 6A and 6B, it may be seen that the measured values of the degree of velocity of the ground surface displacement obtained using the MAI stacking method proposed by the present embodiment showed high precision and the removal of noise compared to the results obtained by the common stacking method.

Furthermore, as a result of the comparison and verification performed on regular GPS observation data collected by the regular observatories, it could be seen that the measured values obtained using the MAI stacking method proposed by the present embodiment had an observation error of about 1.08 cm/yr, whereas the measured values obtained using the common stacking method has an observation error of about 2.04 cm/yr. Furthermore, like in the experimental results of FIGS. 5A through 5D, it could be seen that with regard to a deviation in the velocity values of the ground surface displacement, the MAI stacking method proposed by the present embodiment achieved higher precision than the common stacking method.

Therefore, the method and apparatus for stacking multi-temporal MAI interferograms according to the embodiments of the present invention can improve the precision of the observation of ground surface displacement in the along-track direction of an imaging radar up to a level of 1 cm/yr. Accordingly, minute displacement in geotectonic movement areas, such as a ground subsidence area and a fault belt, which has been difficult to observe so far due to low observational precision, can be measured.

Furthermore, an improvement in the precision of the observation of ground surface displacement in the along-track direction is directly related to the accurate extraction of three-dimensional ground surface displacement. Accordingly, three-dimensional ground surface displacement for an area in which minute displacement occurs can be restored, and the cause of the occurrence of the displacement and the size and range of the occurrence of the displacement can be accurately determined. Therefore, the present invention may be used to examine the stability of unconsolidated sediment and reclaimed land, to monitor ground subsidence in a downtown area, and to examine stability required to select a site for a nuclear power plant.

A method of stacking multi-temporal MAI interferograms according to an embodiment of the present invention is described based on the foregoing description.

Figure 2:
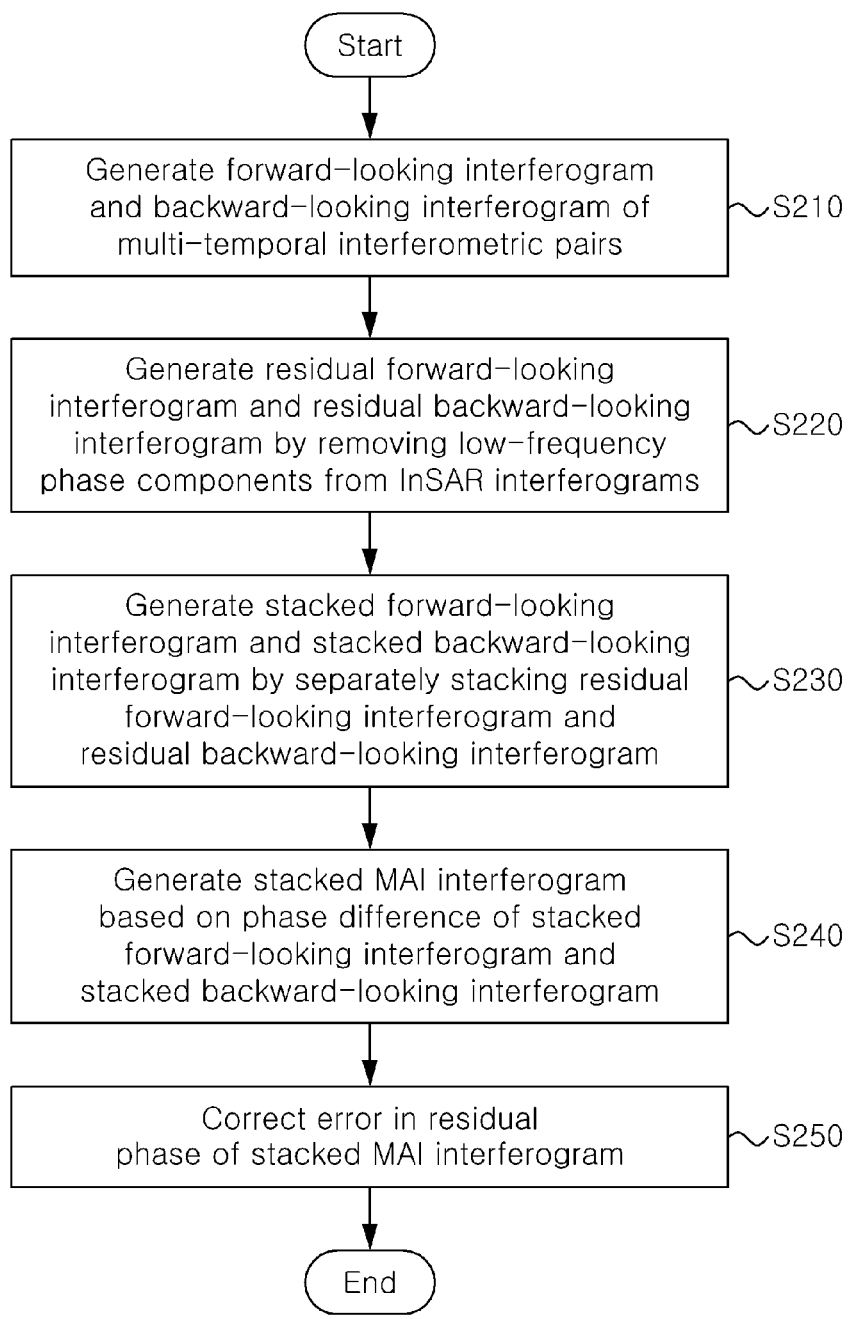
FIG. 2 is a flowchart showing a method of stacking multi-temporal MAI interferograms according to an embodiment of the present invention.

FIG. 2 is a flowchart showing a method of stacking multi-temporal MAI interferograms according to an embodiment of the present invention.

Referring to FIG. 2, first, the interferogram generation unit 110 generates forward-looking interferograms and backward-looking interferograms of multi-temporal interferometric pairs at step S210.

That is, the interferogram generation unit 110 generates the SLC images of a forward-looking imaging radar and a backward-looking imaging radar with respect to master and slave images of each of the multi-temporal interferometric pairs, accurately co-registers the SLC images, and generates forward-looking interferograms and backward-looking interferograms via complex conjugate multiplication.

In this case, the selection of the multi-temporal interferometric pairs is determined by taking into account a perpendicular baseline between satellite sensors. The perpendicular baseline refers to a vertical component in the LOS direction from the difference between the locations of two satellite sensors when the two satellite sensors observe the same scatterer on the ground surface at two observation times. An increase in the length of the perpendicular baseline causes a reduction in the coherence of InSAR interferograms. An interferometric pair having a perpendicular baseline length equal to or longer than a threshold does not generate an interferometric phase. Accordingly, multi-temporal interferometric pairs having a short perpendicular baseline may be selected as the multi-temporal interferometric pairs that are used in the present embodiment.

Furthermore, each of the forward-looking interferograms generated by the interferogram generation unit 110 is generated from a forward-looking SLC image pair generated from the master and slave images. Each of the backward-looking interferograms generated by the interferogram generation unit 110 is generated from a backward-looking SLC image pair generated from the master and slave images. In this case, the forward-looking SLC image and the backward-looking SLC image are generated via signal compression after Doppler center frequencies and Doppler bandwidths in forward-looking and backward-looking have been determined based on a normalized squint adjustment parameter. The normalized squint adjustment parameter is used to electrically adjust the antenna aperture size of a sub-aperture SLC image. Generally, 0.5 is used as the value of the normalized squint adjustment parameter. As the value of the squint adjustment parameter becomes close to 1, the bandwidth of a sub-aperture Doppler is reduced, and the resolution of a forward-looking SLC image and a backward-looking SLC image is reduced.

Furthermore, the interferogram generation unit 110 may generate the forward-looking interferogram and the backward-looking interferogram in accordance with the following common procedure.

That is, when generating the forward-looking interferogram and the backward-looking interferogram, the interferogram generation unit 110 performs the process of (1) generating the SLC images of the data of master and slave images via the signal compression of raw multi-temporal imaging radar data, (2) accurately co-registering the master and slave images, (3) performing common band filtering on an interferometric pair in order to improve the quality of the interferograms, (4) calculating a phase difference via the complex conjugate multiplication of the two co-registered images, and (5) removing a topographic altitude phase using a digital elevation model (DEM). In this case, a phase unwrapping process is not performed.

In this case, at process (2) of accurately co-registering the master and slave images, the accurate co-registration process of re-sampling the slave image based on the master image uses the same transform coefficient when generating the forward-looking interferogram and the backward-looking interferogram and when generating an InSAR interferogram. Accordingly, the interferogram generation unit 110 according to the present embodiment may generate the forward-looking interferogram and the backward-looking interferogram by applying a conversion equation, used to generate the InSAR interferogram, in the same manner when the interferogram is generated.

Thereafter, the residual interferogram generation unit 120 generates residual forward-looking interferograms and residual backward-looking interferograms by removing low-frequency phase components from InSAR interferograms at step S220.

More specifically, the residual interferogram generation unit 120 generates the residual forward-looking interferograms and the residual backward-looking interferograms by removing low-frequency phase components from InSAR interferograms generated via a full-aperture Doppler bandwidth from the sub-aperture interferograms, i.e., the forward-looking interferograms and the backward-looking interferograms. In this case, the sub-aperture interferogram refers to a forward-looking interferogram or a backward-looking interferogram. The full-aperture interferogram refers to an interferogram generated from a master SLC image and a slave SLC image generated using all valid signals without dividing an aperture. Furthermore, in this case, the residual phase components of the generated residual forward-looking interferogram and residual backward-looking interferogram include noise and ground surface displacement phase components in the along-track direction.

Step S220 of generating the residual interferograms is the core technology of a method of stacking multi-temporal MAI interferograms according to the present embodiment. Step S220 may include the step of filtering noise from the InSAR interferogram and the step of calculating phase differences (acquires the differences) between the forward-looking interferogram and the InSAR interferogram and between the backward-looking interferogram the InSAR interferogram.

In this case, at the step of filtering noise from the InSAR interferogram, a high frequency component is removed from the InSAR interferogram. At the step of calculating the phase differences, the phase difference is calculated via the complex conjugate multiplication of the InSAR interferogram filtered at the noise filtering step and the forward-looking interferogram or backward-looking interferogram generated at step S210.

In the residual phase interferogram generated as described above, each of the residual forward-looking interferogram and the residual backward-looking interferogram includes a phase component and noise related to the along-track direction motion of an independent satellite sensor. That is, at step S220, the residual interferogram generation unit 120 generates each of the residual forward-looking interferogram and the residual backward-looking interferogram so that it includes a phase component and noise related to the along-track direction motion of an independent satellite sensor. Since a detailed description thereof has been given above, the detailed description is omitted here.

Thereafter, the stacked interferogram generation unit 130 generates a stacked forward-looking interferogram and a stacked backward-looking interferogram by separately stacking the residual forward-looking interferograms and residual backward-looking interferograms generated by the residual interferogram generation unit 120 at step S230.

That is, at step S230, the stacked interferogram generation unit 130 generates the stacked interferogram by separately stacking the multi-temporal residual forward-looking interferograms and the residual backward-looking interferograms using the residual forward-looking interferograms and residual backward-looking interferograms generated by the residual interferogram generation unit 120.

In an embodiment of the present invention, In the present embodiment, since the residual forward-looking interferograms and the residual backward-looking interferograms are separately stacked via step S230, advantages arise in that a signal to noise ratio (SNR) can be improved via noise attenuation within each sub-aperture interferogram, and thus the coherence between sub-aperture interferograms can be maximized. Furthermore, since an individual MAI interferometric phase calculation process for multi-temporal interferometric pairs is omitted, advantages arise in that an MAI interferogram stacking process can be simplified, and task processing efficiency can be improved.

In this case, the improvement of the coherence between a forward-looking interferogram and a backward-looking interferogram exerts a direct influence on the improvement of quality of an MAI interferogram (i.e., a stacked MAI interferogram in the present embodiment) generated via the above process. Accordingly, step S220 of generating the residual interferograms and step S230 of generating the stacked interferograms may be viewed as corresponding to core processes in the present embodiment.

Equation 1 is a representative factor used to evaluate the quality of an MAI interferogram. Since a detailed description thereof has been given above, the detailed description is omitted here.

Thereafter, the stacked MAI interferogram generation unit 140 may generate a stacked MAI interferogram based on the phase difference calculated using the complex conjugate multiplication of the stacked forward-looking interferogram and the stacked backward-looking interferogram at step S240.

More specifically, at step S240 of generating the stacked MAI interferogram, the phase difference between the stacked forward-looking interferogram and stacked backward-looking interferogram generated at step S230 is calculated. In this case, the process of calculating the phase difference, i.e., a difference acquisition process, is performed via the complex conjugate multiplication of the stacked forward-looking interferogram and the stacked backward-looking interferogram. A stacked MAI interferogram may be obtained based on the stacked MAI interferometric phase calculated by the process.

In this case, the stacked MAI interferogram obtained by the phase difference calculation (difference) process includes a residual phase error (i.e., a flat earth phase and an altitude phase) component generated from the difference between the perpendicular baseline of the stacked forward-looking interferogram and the perpendicular baseline of the stacked backward-looking interferogram. In order to correct the residual phase error component, in an embodiment of the present invention, it may be possible to perform the process of correcting the stacked MAI interferogram after the stacked MAI interferogram has been obtained.

That is, step S250 is the step of correcting an error in the residual phase of the stacked MAI interferogram obtained at step S240. This correction may be performed using a method established by conventional research. For example, a method of generating a polynomial model using information about the location and altitude of each pixel and correcting the residual phase error component using the polynomial model may be used.

Meanwhile, MAI interferometric phases may be stacked by separately stacking residual forward-looking interferograms and residual backward-looking interferograms. The process of measuring ground surface displacement in the along-track direction of a satellite based on the stacked MAI interferometric phases may be expressed by Equation 2. Since a detailed description thereof has been given above, the detailed description is omitted here.

Accordingly, the method of stacking multi-temporal MAI interferograms according to the present embodiment has an advantage in that it can accurately observe three-dimensional ground surface displacement using imaging radar data, and can observe an area in which minute displacement occurs, which has been difficult to observe so far.

The method of stacking multi-temporal MAI interferograms according to the embodiment of the present invention may be implemented in the form of program instructions that are executable by various types of computer means, and may be recorded in a computer-readable storage medium. The computer-readable storage medium may include program instructions, data files, and data structures either independently or in combination. The program instructions stored in the medium may be designed and configured especially for the present invention or may be known to and usable by those skilled in the art of computer software. Examples of the computer-readable storage medium may include a magnetic medium, such as a hard disk, a floppy disk, or magnetic tape, an optical medium, such as CD-ROM or a DVD, a magneto-optical medium, such as a floptical disk, and a hardware apparatus, such as ROM, RAM, or flash memory which is especially configured to store and execute the program instructions. Examples of the program instructions include not only such machine language code that is created by a compiler, but also such high-level language code that is executable by a computer using an interpreter or the like. The hardware apparatus can be configured to function as one or more software modules so as to perform the operation of the present invention, and vice versa.

At least one embodiment of the present invention has the advantage of being able to precisely observe ground surface displacement in an area in which continuous displacement occurs on a small scale.

At least one embodiment of the present invention has the advantage of extracting precise ground surface displacement in the along-track direction of a satellite via the stacking of multi-observed MAI interferograms, thereby improving the precision of the observation of three-dimensional ground surface displacement using imaging radars.

At least one embodiment of the present invention has the advantage of improving the precision of the observation of ground surface displacement in the along-track direction of a satellite, which has been insufficient in the case of conventional technologies, to a centimeter or higher level. That is, an embodiment of the present invention has the advantage of improving the precision of the observation of ground surface displacement in the along-track direction of an imaging radar up to a level of 1 cm/yr using the method of stacking multi-temporal MAI interferograms, thereby being able to measure minute displacement in geotectonic movement areas, such as a ground subsidence area and a fault belt, which has been difficult to observe so far due to low precision.

At least one embodiment of the present invention is a technology which can be widely used in various fields related to the observation of changes on the ground surface. In particular, this embodiment has the advantage of being able to be used to measure the precise three-dimensional ground surface displacement of ground subsidence in reclaimed land or a downtown area and to examine the stability of the ground to select a site for a nuclear power plant.

At least one embodiment of the present invention has the advantage of being able to precisely observe three-dimensional ground surface displacement using imaging radar data and the advantage of being able to observe an area in which minute displacement occurs, which has been difficult to observe so far.

With regard to commercial satellite image processing software, there is an example in which a system for observing time series ground surface displacement using an imaging radar has been installed as an extension module of software. The source technology according to this embodiment has the advantage of being installed in satellite image processing software or being used as a core technology for developing software used to observe three-dimensional ground surface displacement. Accordingly, this embodiment has the advantage of contributing to an increase in the utilization of satellite images and the expansion of the satellite industry via the commercialization of the source technology.

At least one embodiment of the present invention has the advantage of maximizing the utilization of the Arirang 5 (KOMPSAT-5), i.e., a first high-resolution radar satellite in Korea.

The present invention has been derived from research carried out as part of a project for the development of core aerospace technologies sponsored by the Korean Ministry of Science, ICT and Future Planning and the National Research Foundation of Korea (IITA) [Project Management Number: 1345198516, Project Name: Development of Ionic Effect Extraction and Correction Techniques using Satellite Radars].

While the present invention has been described in conjunction with specific details, such as specific configuration elements, and limited embodiments and diagrams above, these are provided merely to help an overall understanding of the present invention, the present invention is not limited to these embodiments, and various modifications and variations can be made from the above description by those having ordinary knowledge in the art to which the present invention pertains.

Therefore, the technical spirit of the present invention should not be determined based on only the described embodiments, and the following claims, all equivalent to the claims and equivalent modifications should be construed as falling within the scope of the spirit of the present invention.

What is claimed is:

1. A method of stacking multi-temporal multiple aperture SAR interferometry (MAI) interferogram, comprising:
   imaging a target using an imaging radar that radiates a beam a portion of which is directed toward the target;
   producing one or more multi-temporal interferometric pairs using photographed data obtained by the imaging radar as a result of the imaging of the target;
   generating, by a processor, a forward-looking InSAR (Interferometric Synthetic Aperture Radar) interferogram and a backward-looking InSAR interferogram of the one or more multi-temporal interferometric pairs;
   generating, by the processor, a residual forward-looking interferogram and a residual backward-looking interferogram by removing low-frequency phase components from the forward-looking InSAR interferogram and the backward-looking InSAR interferogram;
   generating, by the processor, a stacked forward-looking interferogram and a stacked backward-looking interferogram by separately stacking the residual forward-looking interferogram and the residual backward-looking interferogram; and
   generating, by the processor, a stacked MAI interferogram based on a phase difference between the stacked forward-looking interferogram and the stacked backward-looking interferogram.

2. The method of claim 1, further comprising correcting, by the processor, an error in a residual phase of the stacked MAI interferogram using a polynomial model generated based on location and altitude information corresponding to each pixel.

3. The method of claim 1, wherein the generating the stacked MAI interferogram comprises generating the stacked MAI interferogram using the phase difference calculated by complex conjugate multiplication of the stacked forward-looking interferogram and the stacked backward-looking interferogram.

4. The method of claim 1, wherein the generating the residual forward-looking interferogram and the residual backward-looking interferogram comprises:
  filtering by removing, by the processor, high frequency components from the forward-looking InSAR interferogram or the backward-looking the InSAR interferogram; and
  calculating, by the processor, the phase difference by complex conjugate multiplication of the filtered backward-looking InSAR interferogram and the forward-looking interferogram or complex conjugate multiplication of the filtered forward-looking InSAR interferogram and the backward-looking interferogram.

5. The method of claim 4, wherein the generating the residual forward-looking interferogram and the residual backward-looking interferogram comprises generating the residual interferograms so that each of the residual forward-looking interferogram and the residual backward-looking interferogram includes a phase component and noise related to a motion in an along-track direction of an independent satellite sensor.

6. The method of claim 1, wherein the generating the forward-looking InSAR interferogram and the backward-looking InSAR interferogram comprises:
  generating, by the processor, single look complex (SLC) images of a forward-looking imaging radar and a backward-looking imaging radar with respect to master and slave images of the multi-temporal interferometric pairs;
  accurately co-registering, by the processor, the SLC images; and
  generating, by the processor, the forward-looking InSAR interferogram and the backward-looking InSAR interferogram using complex conjugate multiplication.

7. A non-transitory computer-readable medium containing program instructions that, when executed by a processor, causes the processor to execute a method of stacking multi-temporal multiple aperture SAR interferometry (MAI) interferogram, comprising:
  program instructions that produce one or more multi-temporal interferometric pairs using photographed data of a target;
  program instructions that generate a forward-looking InSAR (Interferometric Synthetic Aperture Radar) interferogram and a backward-looking InSAR interferogram of the one or more multi-temporal interferometric pairs;
  program instructions that generate a residual forward-looking interferogram and a residual backward-looking interferogram by removing low-frequency phase components from the forward-looking InSAR interferogram and the backward-looking InSAR interferogram;
  program instructions that generate a stacked forward-looking interferogram and a stacked backward-looking interferogram by separately stacking the residual forward-looking interferogram and the residual backward-looking interferogram; and
  program instructions that generate a stacked MAI interferogram based on a phase difference between the stacked forward-looking interferogram and the stacked backward-looking interferogram,
  wherein an imaging radar that radiates a beam a portion of which is directed toward the target images the target and thereby generates the photographed data of the target.

8. An apparatus for stacking multi-temporal MAI interferogram, comprising a processor configured to:
  produce one or more multi-temporal interferometric pairs using photographed data of a target;
  generate a forward-looking InSAR (Interferometric Synthetic Aperture Radar) interferogram and a backward-looking InSAR interferogram of the one or more multi-temporal interferometric pairs;
  generate a residual forward-looking interferogram and a residual backward-looking interferogram by removing low-frequency phase components from the forward-looking InSAR interferogram and the backward-looking InSAR interferogram;
  generate a stacked forward-looking interferogram and a stacked backward-looking interferogram by separately stacking the residual forward-looking interferogram and the residual backward-looking interferogram; and
  generate a stacked MAI interferogram based on a phase difference between the stacked forward-looking interferogram and the stacked backward-looking interferogram,
  wherein an imaging radar that radiates a beam a portion of which is directed toward the target images the target and thereby generates the photographed data of the target.

9. The apparatus of claim 8, wherein the processor is further configured to:
  correct an error in a residual phase of the stacked MAI interferogram using a polynomial model generated based on location and altitude information corresponding to each pixel.

10. The apparatus of claim 8, wherein the processor is further configured to generate the stacked MAI interferogram using a phase difference calculated by complex conjugate multiplication of the stacked forward-looking interferogram and the stacked backward-looking interferogram.

11. The apparatus of claim 8, wherein the processor is further configured to:
  filter by removing high frequency components from the forward-looking InSAR interferogram or the backward-looking the InSAR interferogram; and
  calculate the phase difference by complex conjugate multiplication of the filtered backward-looking InSAR interferogram and the forward-looking interferogram or complex conjugate multiplication of the filtered forward-looking InSAR interferogram and the backward-looking interferogram.

12. The apparatus of claim 11, wherein the processor is further configured to generate the residual interferograms so that each of the residual forward-looking interferogram and the residual backward-looking interferogram includes a phase component and noise related to a motion in an along-track direction of an independent satellite sensor.

13. The apparatus of claim 8, wherein the processor is further configured to:
  generate single look complex (SLC) images of a forward-looking imaging radar and a backward-looking imaging radar with respect to master and slave images of the multi-temporal interferometric pairs;
  accurately co-register the SLC images; and
  generate the forward-looking InSAR interferogram and the backward-looking InSAR interferogram using complex conjugate multiplication.

* * * * *